US012719129B2

(12) United States Patent
Schmitt et al.

(10) Patent No.: US 12,719,129 B2
(45) Date of Patent: Aug. 25, 2026

(54) BATTERY MODULE INCLUDING TAPPING ELEMENT AND HOUSING CONNECTED IN FLUID-TIGHT MANNER

(71) Applicant: Robert Bosch GmbH, Stuttgart (DE)

(72) Inventors: Markus Schmitt, Tamm (DE); Jerome Homann, Renningen (DE); Michael Hienzsch, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 560 days.

(21) Appl. No.: 18/170,117

(22) Filed: Feb. 16, 2023

(65) Prior Publication Data

US 2023/0268605 A1 Aug. 24, 2023

(30) Foreign Application Priority Data

Feb. 18, 2022 (DE) .................... 10 2022 201 722.6

(51) Int. Cl.
*H01M 50/296* (2021.01)
*H01M 10/0525* (2010.01)
(Continued)

(52) U.S. Cl.
CPC ..... *H01M 50/296* (2021.01); *H01M 10/0525* (2013.01); *H01M 50/224* (2021.01);
(Continued)

(58) Field of Classification Search
CPC .. H01M 50/296; H01M 50/509; H01M 50/51; H01M 50/224; H01M 50/512; H01M 10/0525
(Continued)

(56) References Cited

U.S. PATENT DOCUMENTS

2016/0149177 A1* 5/2016 Sugeno ............... H01M 10/425 429/151
2018/0083237 A1* 3/2018 Wang .................. H01M 50/296
(Continued)

FOREIGN PATENT DOCUMENTS

CN 109921235 A * 6/2019
CN 112310691 A * 2/2021 ........... H01R 13/641
(Continued)

OTHER PUBLICATIONS

"Annular." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1221980. (Year: 2010).*
(Continued)

*Primary Examiner* — Sean P Cullen
(74) *Attorney, Agent, or Firm* — Michael Best & Friedrich LLP

(57) ABSTRACT

A battery module includes a plurality of battery cells which are received in an interior of a housing of the battery module and which are electrically conductively connected to one another in series and/or in parallel, wherein the housing comprises an opening which is designed to guide a voltage tap of the battery module from the interior of the housing, and the battery module further includes a tapping element which is designed to contact the voltage tap of the battery module from an environment of the battery module, wherein the housing and the tapping element are connected to one another in a fluid-tight manner with respect to the environment, wherein a sealing element of the housing is raised relative to a surface of the housing, which surface is arranged so as to directly surround the sealing element.

11 Claims, 3 Drawing Sheets

(51) Int. Cl.
*H01M 50/224* (2021.01)
*H01M 50/509* (2021.01)
*H01M 50/51* (2021.01)
*H01M 50/512* (2021.01)

(52) U.S. Cl.
CPC ......... *H01M 50/509* (2021.01); *H01M 50/51* (2021.01); *H01M 50/512* (2021.01)

(58) Field of Classification Search
USPC ......................................... 429/156, 158, 159
See application file for complete search history.

(56) References Cited

U.S. PATENT DOCUMENTS

2020/0006722 A1* 1/2020 Tanner .............. H01M 10/6556
2023/0123353 A1* 4/2023 Qian .................. H01M 50/249 439/490

FOREIGN PATENT DOCUMENTS

DE 102015222137 B3 2/2017
EP 2355206 A1 * 8/2011 .......... H01M 50/516

OTHER PUBLICATIONS

"Ring." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1285211. (Year: 2010).*
"Circular." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1233313. (Year: 2010).*

* cited by examiner 10,15
17
14
11
1
3
18
12
9
7
5
6
18,19
20

BATTERY MODULE INCLUDING TAPPING ELEMENT AND HOUSING CONNECTED IN FLUID-TIGHT MANNER

BACKGROUND

The invention proceeds from a battery module.

A battery module comprises a plurality of individual battery cells, each having a positive voltage tap and a negative voltage tap, wherein the respective voltage taps are electrically conductively connected to one another for an electrically conductive series and/or parallel connection of the plurality of battery cells to one another and can thus be interconnected to form the battery module. In particular, the battery cells can each have a first voltage tap, in particular a positive voltage tap, and a second voltage tap, in particular a negative voltage tap, which are electrically conductively connected to one another by means of cell connectors, such that an electrical series and/or parallel connection of the battery cells is formed.

Battery modules in turn are furthermore interconnected to form batteries or entire battery systems.

SUMMARY

A battery module having the features that a voltage tap of the battery module can be reliably sealed off from an environment of the battery module.

For this purpose, a battery module comprising a plurality of battery cells, which are designed in particular as lithium-ion battery cells, is provided according to the invention. The battery cells are received in an interior of a housing of the battery module.

Furthermore, the battery cells are electrically conductively connected to one another in series and/or in parallel. In this case, the housing comprises an opening which is designed to guide a voltage tap of the battery module from the interior of the housing. Furthermore, the battery module comprises a tapping element which is designed to contact the voltage tap of the battery module from the environment. The housing and the tapping element are connected to one another in a fluid-tight manner with respect to an environment. According to the invention, a sealing element of the housing is raised relative to a surface of the housing, which surface is arranged so as to directly surround the sealing element.

The voltage tap of the battery module is used in particular to tap a total voltage of the battery module or to charge the battery module. The battery module preferably comprises a first voltage tap, in particular a positive voltage tap, and a second voltage tap, in particular a negative voltage tap.

The sealing element of the battery module is used in particular to connect the housing and the tapping element to one another in a fluid-tight manner with respect to the environment.

A tapping element of the battery module is to be understood to mean a component which comprises at least one connection, by means of which the battery module can be electrically and/or electronically contacted. In particular, the tapping element comprises a first connection by means of which a first voltage tap of the battery module can be contacted, and the tapping element comprises a second connection by means of which a second voltage tap of the battery module can be contacted. The first connection and the second connection are electrically conductively connected to the relevant voltage tap of the battery module. Furthermore, the tapping element can preferably comprise a housing which protects the at least one connection and is used to form a reliable connection to further elements from the environment. In particular, the housing can also be used for electrical insulation.

In particular, there are surfaces of the housing of the battery module that cannot be avoided due to space restrictions, or interfaces between the battery module and other components on which condensate or liquid can deposit or accumulate, which means there is a risk, for example, of corrosive infiltration of a sealing element or sealing surface, which in particular can also lead to leakage from the battery over its service life. With an embodiment of the battery according to the invention, the requirements regarding the tightness of the interior of the housing of the battery module with respect to the environment over its entire service life can be met.

In particular, by raising the sealing element of the housing relative to the surface of the housing, which surface is arranged so as to directly surround the sealing element, accumulating condensate, for example, can be reliably kept away from the sealing surface. It can thus be prevented in particular that condensate can reach the sealing surface directly. An increase is to be understood to mean that, in the case of a conventional orientation of the battery module, in particular during operation, a spacing is formed in a vertical direction which is in particular opposite the direction of the weight force. The sealing surface here describes in particular those surfaces of the sealing element and of the tapping element which are directly connected to one another such that a seal is formed.

In this regard, it should first be noted that an interface between the housing of the battery module and the tapping element is reliably sealed off in a fluid-tight manner from the environment. In particular, the interior of the housing of the battery module is reliably sealed off in a fluid-tight manner.

It is expedient if the housing of the battery module is made of a metal material, in particular aluminum. The housing of the battery module is preferably designed as an aluminum die-cast housing. Furthermore, the housing of the battery module can have a cathodic dip coating (CDC), a powder coating and/or an anodized coating. The housing thus has increased protection against corrosion compared to the base material of the housing. As a result, corrosive infiltration that could originate from uncoated regions can be avoided. The housing of the battery module could also have a passivation layer, in particular a chromium III coating, for corrosion protection to protect the surface. Furthermore, a local coating with a primer would also be conceivable.

Particularly preferably, the housing of the battery module forms the sealing element. In this way, a particularly reliable seal can be formed.

The tapping element and the housing are expediently connected to one another by means of a plurality of screw connections. The screw connections each comprise a screw means receptacle, in each of which a screw means is received. In this case, a contact surface of the screw means receptacle is raised relative to a surface of the housing, which surface is arranged so as to directly surround the screw means receptacle.

In particular, by raising the contact surface of the screw means receptacle relative to the surface of the housing, which surface is arranged so as to directly surround the screw means receptacle, accumulating condensate, for example, can be reliably kept away from the screw surface. It can thus be prevented in particular that condensate can reach the screw surface directly. An increase is to be understood to mean that, in the case of a conventional orientation of the battery module, in particular during operation, a spacing is formed in a vertical direction which is in particular opposite the direction of the weight force. The screw surface here describes in particular the surfaces of the screw means receptacle, in particular of the bearing surface, and of the tapping element which are directly connected to one another such that a mechanical connection is formed.

It is expedient if the contact surface of the screw means receptacle and the tapping element are directly connected. This makes it possible for a sufficient surface pressure to be formed between the housing of the battery module and the tapping element, such that a penetration of condensate into the sealing gap formed can be avoided. In particular, a hard stop between, for example, the tapping element and a head of a screw means can advantageously also be formed as a result. In particular, what is referred to as a hard joint having metal contact surfaces is thus formed.

Particularly preferably, the screw means receptacles are each designed as screw domes. In this case, the screw domes can in particular be geometrically formed in such a way that their contact surfaces are minimized against corrosion.

In particular, it should be noted at this point that the plurality of screw connections are used as a mechanical connection between the housing and the tapping element.

Furthermore, it is preferred if a screw connection, in particular a screw means receptacle, and the sealing element are arranged spaced apart in such a way that capillary effects, in particular through the screw connections to the sealing element, are avoided. As a result, it is possible to adjust the spacing between what is referred to as a screw surface and what is referred to as a sealing surface in such a way that no condensate can reach the sealing surface from the screw surface, for example due to capillary effects.

Furthermore, the surface of the housing, which surface is arranged so as to directly surround the sealing element and/or the surface of the housing, which surface is arranged so as to directly surround the screw means receptacle, is formed in a sloping manner in the direction pointing away from the sealing element.

In particular, the screw connection is arranged outside of the sealing element. First, it should be noted at this point that an arrangement of the screw connection outside of the sealing element is understood in particular to mean that the screw connections do not pass through or contact the sealing element, in particular its sealing material, but are arranged spaced apart there-from. As a result, the screw connections are in particular not arranged in the region designed for sealing. The screw connections are therefore arranged between the environment and the sealing element.

In particular, it is possible with an embodiment of the battery module according to the invention that a battery module arranged in an exterior region of a vehicle, for example, can also counteract corrosive loads over its service life. In particular, the sealing points between the housing of the battery module and the tapping element are protected against corrosive infiltration.

At this point it should be noted that, for example due to the requirements of the sealing element in terms of surface roughness and flatness of the sealing surface, a mechanically machined surface is preferred in these regions. In one operation, both the sealing surface and the screw-on surface can be produced by material removal. This has the advantage that the flatness can be adjusted very precisely over both surfaces and the resulting seal compression fluctuates less.

BRIEF DESCRIPTION OF THE DRAWINGS

Exemplary embodiments of the invention are illustrated in the drawings and explained in more detail in the following description.

In the drawings.

DETAILED DESCRIPTION

Figure 1:
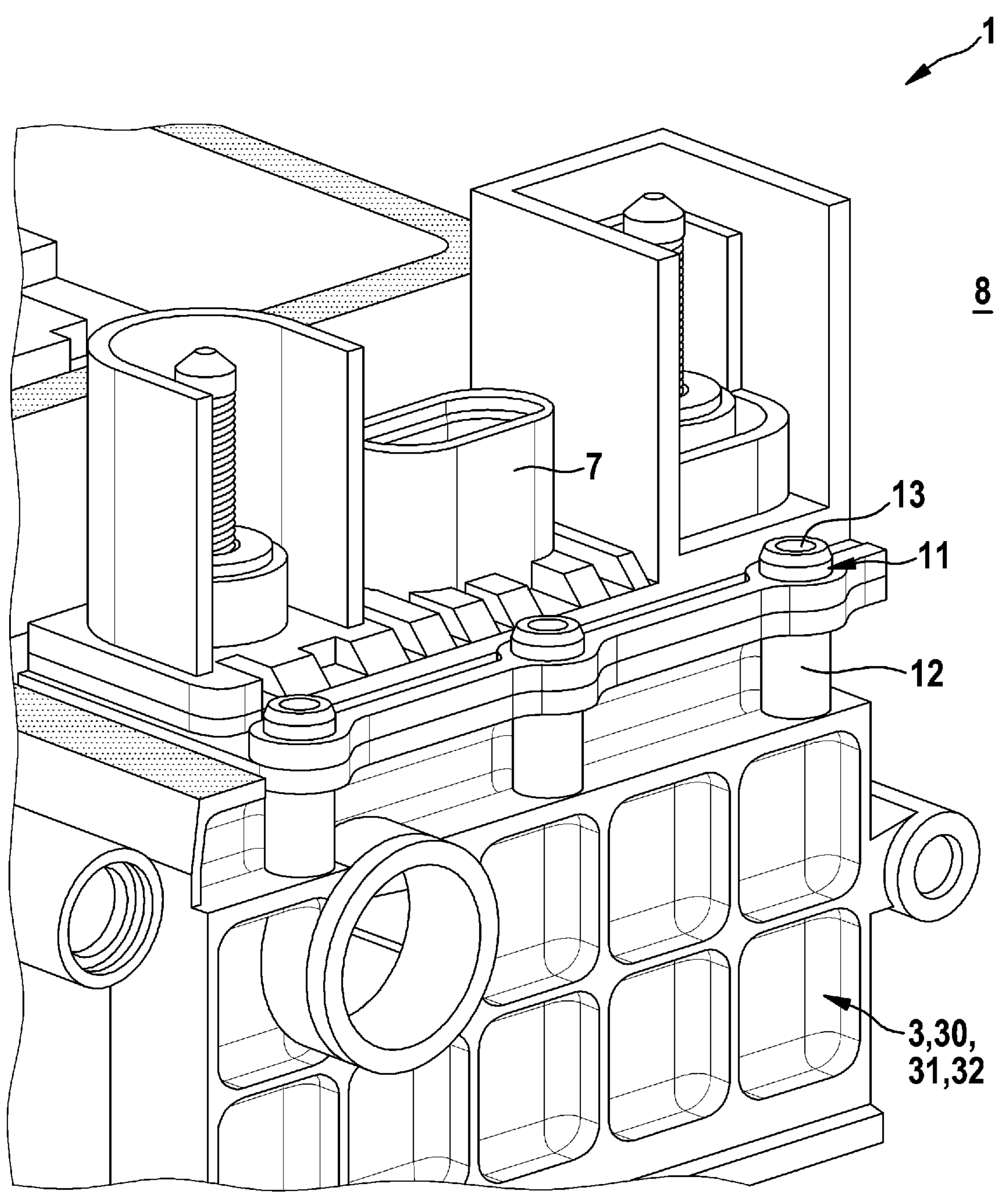
FIG. 1 is a perspective view of a section of an embodiment of a battery module according to the invention.

FIG. 1 is a perspective view of a section of an embodiment of a battery module 1 according to the invention.

The battery module 1 comprises a plurality of battery cells 2, which cannot be seen in FIG. 1. The battery cells are in particular designed as lithium-ion battery cells 2. Furthermore, the battery cells 2 are electrically conductively connected to one another in series and/or in parallel.

The battery cells 2 are received in an interior 4 of a housing 3 of the battery module 1. In particular, the housing 3 of the battery module 1 is made of a metal material 30, in particular aluminum 31. Particularly preferably, the housing 3 of the battery module 1 is designed as an aluminum die-cast housing 32.

Furthermore, the housing 3 of the battery module 1 comprises an opening 5 which cannot be seen in FIG. 1 and which is designed to guide a voltage tap 6 of the battery module 1 out of the interior 4 of the housing 3.

The battery module 1 further comprises a tapping element 7 which is designed to contact the voltage tap 6 of the battery module 1 from the environment 8 of the battery module 1.

The housing 3 and the tapping element 7 are connected to one another in a fluid-tight manner with respect to the environment 8 of the battery module 1.

In particular, the tapping element 7 and the housing 3 are connected to one another by means of a plurality of screw connections 11. The screw connections 11 each comprise a screw means receptacle 12, in each of which a screw means 13 is received. The screw means receptacles 12 are preferably designed as screw domes 16.

Figure 2:
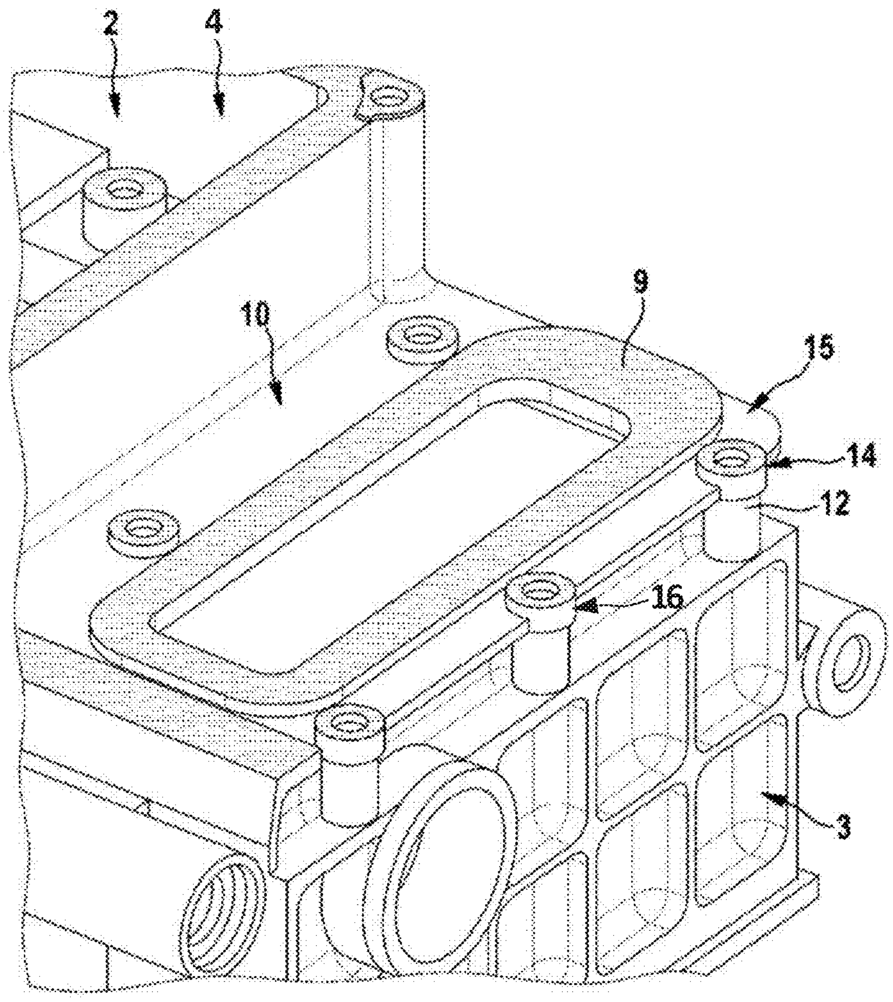
FIG. 2 is a perspective view of a section of a housing of an embodiment of a battery module according to the invention.

FIG. 2 is a perspective view of a section of a housing 3 of an embodiment of a battery module 1 according to the invention.

A sealing element 9 of the housing 3 can be seen here. In this case, the sealing element 9 of the housing 3 is raised relative to a surface 10 of the housing 3, which surface is arranged so as to directly surround the sealing element 9. In particular, according to the embodiment shown in FIG. 2, the housing 3 of the battery module 1 forms the sealing element 9.

In this case, a screw means receptacle 12, which has a bearing surface 14, can also be seen. The contact surface 14 of the screw means receptacle 12 is raised relative to a surface 15 which is arranged so as to directly surround the screw means receptacle 12. At this point it should be noted that the contact surface 14 of the screw means receptacle 12 and the tapping element 7 are directly connected.

The screw connections 11, in particular the screw means receptacles 12, and the sealing element 9 are arranged spaced apart from one another in such a way that capillary effects, in particular through the screw connection 11 to the sealing element 9, are avoided.

Furthermore, FIG. 2 also shows the interior 4 of the housing 3, in which the plurality of battery cells 2 is received.

It should also be noted at this point that, according to a particularly preferred embodiment, the surface 10 of the housing 3, which surface is arranged so as to directly surround the sealing element 9 and/or the surface 15 of the housing 3, which surface is arranged so as to directly surround the screw means receptacle 12, is formed in a sloping manner in the direction pointing away from the sealing element 9.

It can also be seen that the plurality of screw connections 11 is arranged outside of the sealing element 9.

Figure 3:
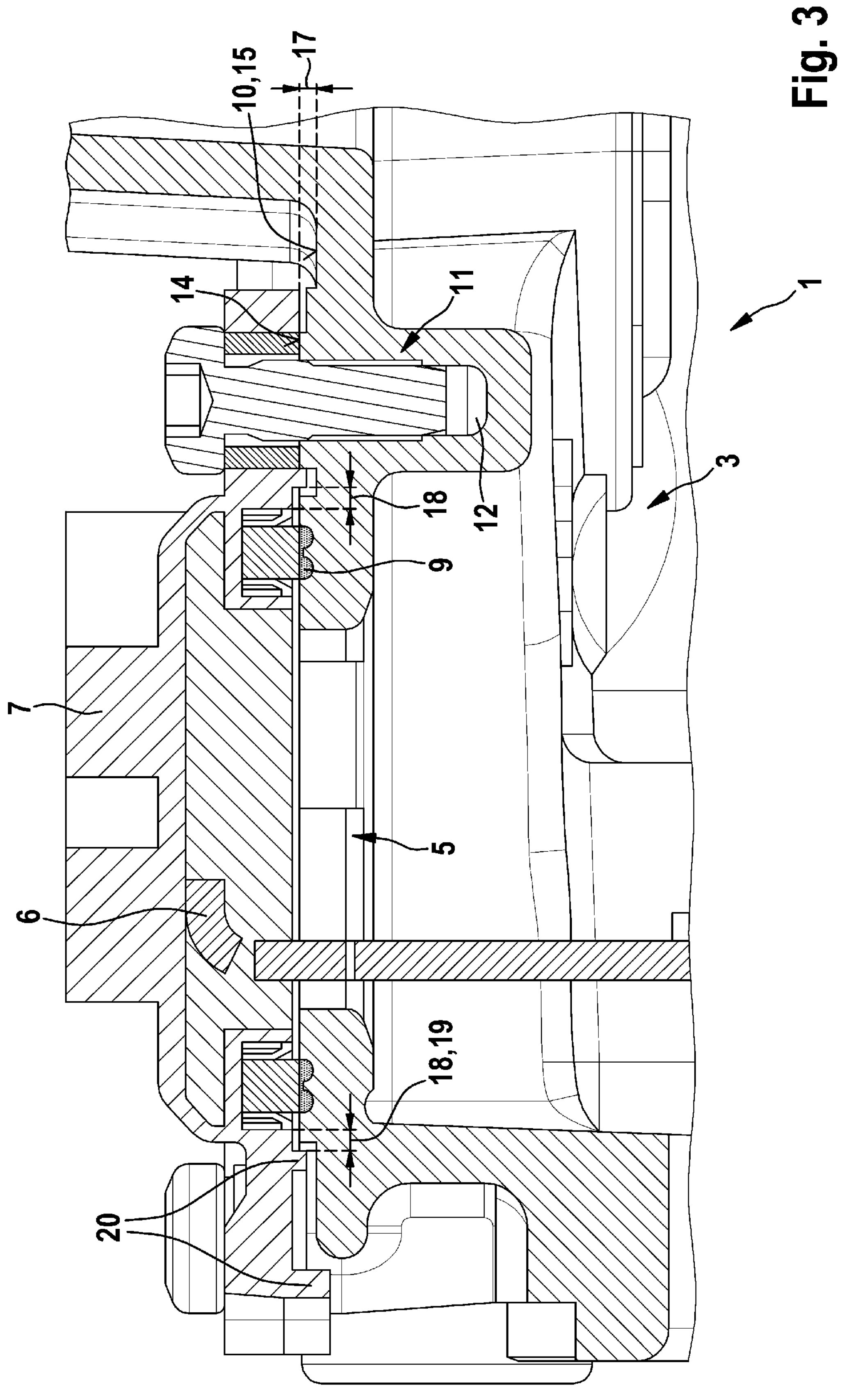
FIG. 3 is a sectional view of a section of an embodiment of a battery module according to the invention.

FIG. 3 is a sectional view of a section of an embodiment of a battery module 1 according to the invention.

First of all, the housing 3 of the battery module 1 and the tapping element 7 of the battery module 1 can be seen.

Furthermore, the opening 5 of the housing 3 of the battery module 1 and the voltage tap 6 of the battery module 1 can also be seen.

The sealing element 9 of the housing 3 is raised relative to a surface 10 of the housing 3, which surface is arranged so as to directly surround the sealing element 9, and the bearing surface 14 of the screw means receptacle 12 is raised relative to a surface 15 of the housing 3, which surface is arranged so as to directly surround the bearing surface 14. At this point it should be noted that the surface 10 and the surface 15 can have the same height. Furthermore, the sealing element 9 and the bearing surface 14 can also have the same height.

The respective elevations are here denoted by the spacing 17. In particular, this spacing is selected such that a condensate accumulating on the surface 10 and the surface 15 can reliably be kept away from the sealing surface and the screw-on surface and in particular can also be removed.

Furthermore, the screw connections 11 and the sealing element 9 are arranged spaced apart from one another in such a way that capillary effects are avoided. This prevents condensate from reaching the sealing surface from the screw surface due to the capillary effect.

Furthermore, a gap 18 is formed on the sealing surface upstream of the sealing element 9, the length 19 of which is formed in such a way that a possible amount of condensate upstream of the sealing element 9 is minimized. The upstream gap 18 is selected such that drying of a condensate is ensured.

Furthermore, a spacing between a circumferential collar 20 and the surface 10 of the housing 3 and the surface 15 of the housing 3 is designed such that a capillary effect is minimized. This spacing is selected such that drying of a condensate is ensured. In particular, the circumferential collar 20 protects the sealing element 9 from direct jets of water, for example when using a pressure washer, and thus prevents damage to the sealing element 9.

Overall, the contact time of a condensate on the sealing point can thus be minimized.

The invention claimed is:

1. A battery module comprising:

a plurality of battery cells (2) which are received in an interior (4) of a housing (3) of the battery module (1) and which are electrically conductively connected to one another in series and/or in parallel, wherein the housing (3) comprises an opening (5) which is designed to guide a voltage tap (6) of the battery module (1) from the interior (4) of the housing (3), the opening (5) defined within an exterior surface (10) of the housing (3), and the battery module (1) further comprises a tapping element (7), which is designed to contact the voltage tap (6) of the battery module (1) from an environment (8) of the battery module (1), wherein the housing (3) and the tapping element (7) are connected to one another in a fluid-tight manner with respect to the environment (8), wherein a sealing element (9) of the housing (3) extending directly from the exterior surface (10) in a direction away from the interior (4) of the housing (3) and surrounding an entire perimeter of the opening (5), and wherein the tapping element (7) and the housing (3) are connected to one another by a plurality of screw connections (11), wherein the screw connections (11) each comprise a screw receptacle (12), in each of which a screw (13) is received, wherein a bearing surface (14) of the screw receptacle (12) is formed as part of the housing (3) and raised relative to a second surface (15) of the housing (3), wherein the second surface (15) is arranged so as to directly surround the screw receptacle (12).

2. The battery module according to claim 1, wherein the plurality of battery cells (2), are lithium-ion battery cells (2).

3. The battery module according to claim 1, wherein the bearing surface (14) of the screw receptacle (12) and the tapping element (7) of the battery module (1) are directly connected.

4. The battery module according to claim 1, wherein the screw receptacles (12) are each designed as screw domes (16).

5. The battery module according to claim 1, wherein a screw connection (11) and the sealing element (9) are arranged spaced apart from one another in such a way that capillary effects to the sealing element (9) are avoided.

6. The battery module according to claim 1, wherein the plurality of screw connections (11) is arranged outside of the sealing element (9).

7. The battery module according to claim 1, wherein the housing (3) forms the sealing element (9).

8. The battery module according to claim 1, wherein the exterior surface (10) of the housing (3) and/or the second surface (15) of the housing (3) are formed in a sloping manner in a direction pointing away from the sealing element (9).

9. The battery module of claim 1, wherein the sealing element (9) and the bearing surface (14) each extend away from the exterior surface (10) by an equal height.

10. The battery module according to claim 1, wherein the housing (3) is made of a metal material (30).

11. The battery module according to claim 10, wherein the housing (3) is made of aluminum (31), and wherein the housing (3) of the battery module (1) is designed as an aluminum die-cast housing (32).

* * * * *